United States Patent [19]

Barasch et al.

[11] Patent Number: 4,872,354
[45] Date of Patent: Oct. 10, 1989

[54] HOLLOW SHAFT MEASUREMENT DEVICE

[75] Inventors: Marian Barasch, Albany; Charles H. Mirella, Clifton Park, both of N.Y.

[73] Assignee: The United States of America as represented by the Secretary of the Air Force, Washington, D.C.

[21] Appl. No.: 79,366

[22] Filed: Jul. 30, 1987

[51] Int. Cl.[4] .................................... G01R 27/26
[52] U.S. Cl. .................................. 73/865.8; 324/61 R
[58] Field of Search .................... 73/865.8, 866.5, 623; 324/220, 61 P; 364/561, 562; 33/178 E, 178 R, 544, 551–555, 178 F, 542, 543; 279/2 A, 1 D

[56] References Cited

U.S. PATENT DOCUMENTS

| | | | |
|---|---|---|---|
| 2,241,401 | 5/1941 | Haskell | 33/542 |
| 3,679,219 | 7/1972 | Cameron | 279/2 A |
| 3,693,075 | 9/1972 | Forster | 324/40 |
| 3,867,691 | 2/1975 | Plessis | 324/61 R |
| 3,896,662 | 7/1975 | Camp et al. | 73/625 |
| 3,930,404 | 1/1976 | Ryden, Jr. | 73/622 |
| 4,089,227 | 5/1978 | Falgari et al. | 73/622 |
| 4,352,060 | 9/1982 | Garpendahl et al. | 324/61 R |
| 4,418,574 | 12/1983 | Flournoy | 73/601 |
| 4,422,653 | 12/1983 | Piotrowski | 279/2 A |
| 4,442,403 | 4/1984 | Pohler | 324/220 |
| 4,507,608 | 3/1985 | Flach et al. | 324/220 |
| 4,644,261 | 2/1987 | Carter | 324/61 R |
| 4,677,792 | 7/1987 | Speidel | 279/2 A |

FOREIGN PATENT DOCUMENTS 0045951 4/1977 Japan ..................... 33/544

OTHER PUBLICATIONS

Lord et al., "Magnetic Probe Inspection of Steam Generator Tubing", National ASNT Spring Conf, Oct. 1979.

Primary Examiner—Stewart J. Levy
Assistant Examiner—Robert R. Raevis
Attorney, Agent, or Firm—Jules J. Morris; Donald J. Singer

[57] ABSTRACT

A hollow shaft 12 measurement machine 10 which comprises a measurement table 11, a coordinate measurement machine 14, a rotatable hydraulic chuck 16, a movable/rotatable center 18 and a bore gauge 20. The movable/rotatable center allows direct movement of a gauge head 24 within the hollow shaft in order to ascertain the internal shaft measurements. The shaft is held accurately by the rotatable center 18 and by a contractable spline insert of the hydraulic chuck 16 so that the shaft's precise centerline axis can be determined.

2 Claims, 7 Drawing Sheets

HOLLOW SHAFT MEASUREMENT DEVICE

STATEMENT OF GOVERNEMENT INTEREST

The invention described herein may be manufactured and used by or for the Government for governmental purposes without the payment of any royalty thereon.

TECHNICAL FIELD

This invention concerns measuring devices and is particularly related to measuring devices for ascertaining the internal dimensions of hollow shafts.

BACKGROUND OF THE INVENTION

Precision made hollow shafts are required in the manufacture of modern turbine engines and other mechanical devices having rotating parts. In aircraft, for example, most gas turbine engines comprise multiple hollow shafts. An inner shaft is frequently used to connect a low pressure compressor or fan with a low pressure turbine. Inner shafts can also be used to connect a low pressure turbine with a power takeoff assembly. A shorter but larger diameter outer (concentric) shaft is often used in the same engine to connect a high pressure compressor with a high pressure turbine. All of these shafts must be manufactured to exact dimensions, which include interior details, for shaft cooling and lubrication systems to operate correctly. Internal seals and cavities have always presented a major measurement problem when developing highly accurate and efficient assemblies which include hollow shafts. For example, if air seals are included inside a hollow shaft, seal reliability and efficiency greeatly depends on their dimensional accuracy.

In the past is has been very difficult to accurately check dimensions inside hollow shafts and internal seals. One method of measuring internal cavities has been to fill the cavity or shaft portion with a dimensionally stable liquid material such as room-temperature vulcanizing rubber. When the material solidifies, it is cut and removed, so that it can be measured for its external size which, hopefully, equals the internal dimensions of the shaft portion or cavity. In other instances where this is not possible, the machines used to manufacture these parts are made as highly reliable as possible in order to minimize the chances of dimensional variations during manufacture.

Neither of the above methods and apparatus have proven to be entirely reliable or as accurate as direct measurement. Further, other means of ascertaining internal dimensions have proven cumbersome and slow.

In view of the above, a need exists for a measurement device that can quickly and accurately be used to map the internal dimensions of a hollow shaft, seal or other cavity.

SUMMARY OF THE INVENTION

The invention comprises a hollow shaft measurement machine in which an internal measurement means is mounted upon a measurement table. The internal measurement means if for ascertaining the internal dimensions of the hollow shaft to be measured.

The internal measurement means comprises a rotatable chuck mounted to the measurement surface for restraining and rotating a first end of the hollow shaft to be measured. The rotatable chuck may include a variable diameter spline mating collar for engaging a spline surface on the hollow shaft and determining a shaft center axis therefrom. In addition, the internal measurement means includes a movable and rotatable center for holding a second end of the hollow shaft. A gauge head is moved through a hole in the movable center in order to ascertain the internal dimensions of the hollow shaft.

In a preferred embodiment of the invention, the movable center is associated with a carriage that is mounted for movement on an air rail affixed to the measurement surface in order to accommodate shafts of differing lengths. It is preferred that the carriage comprises gauge means for monitoring the gap between the carriage and the slide. The gauge means is used to detect excessive radial load on the movable center as may be caused by misalignment or bends in the hollow shaft examined.

In the preferred embodiment of the invention, it is further desired that there be multiple interchangable gauge heads which can be used with a wide variety of hollow shafts.

A further preferred aspect of the invention is the use of an electronic signal processing device such as a computer, in order to dimensionally map the interior and exterior of the hollow shaft.

It is therefore an object of this invention to provide a highly accurate device for directly determining the internal dimensions of hollow shafts.

It is a further object of this invention to provide a device capable of measuring the internal dimensions of a variety of hollow shafts of differing sizes.

BRIEF DESCRIPTION OF THE DRAWINGS

The foregoing objects and other advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
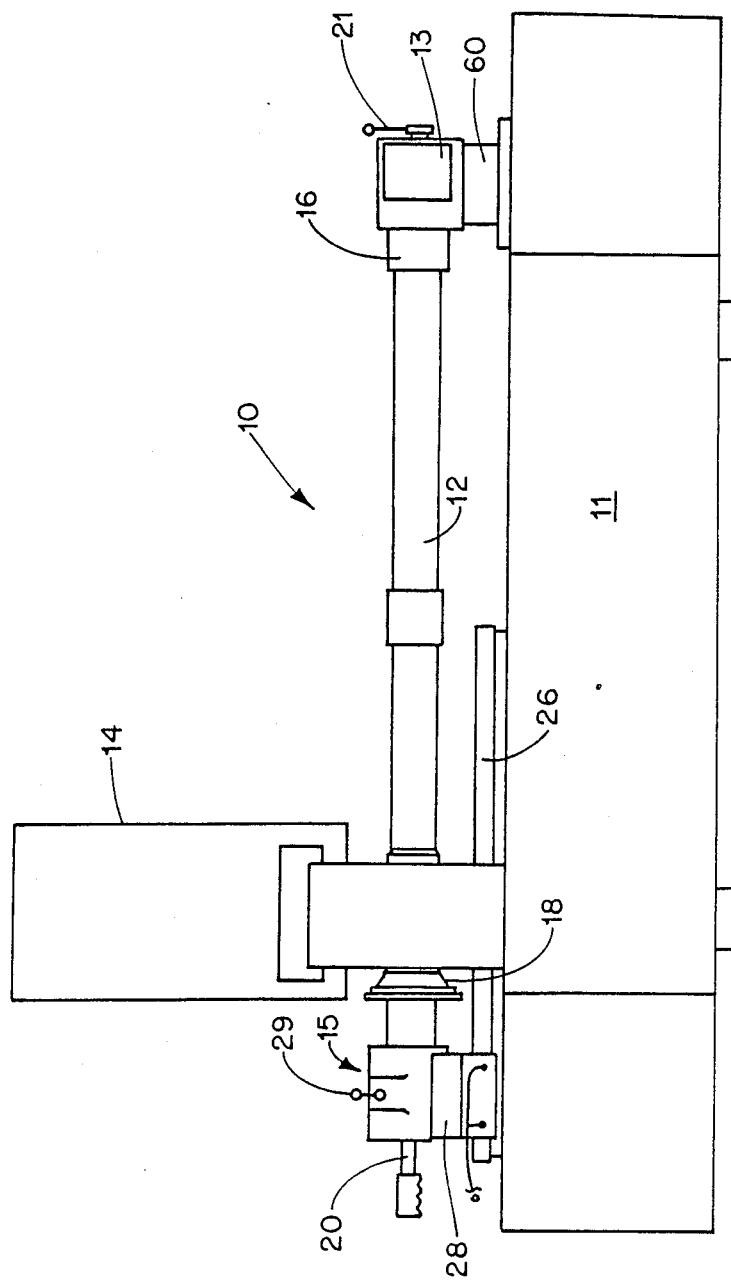
FIG. 1 is a side view of a hollow shaft measurement machine embodying the principles of this invention.

FIG. 1 shows a hollow shaft measurement machine 10 for mesuring hollow shafts (12). The shaft measurement machine comprises several major components, including a measurement table 11, a coordinate measuring machine 14, an hydraulic chuck 16, a bore gauge probe 20 and a movable/rotatable center assembly 15. The coordinate measuring machine 14 is a conventional measurement device used to determine the exterior dimension of shafts.

An exemplary shaft 12 is held by a novel hydraulic chuck 16 and a custom built movable/rotatable center 18. The movable/rotatable center 18 is also referred to as a "live" center. The bore gauge is mounted for sliding movement through the live center 18, and is used to ascertain the internal dimensions of shaft 12 All the major components are mounted to a measurement table 11 that has been honed for precision flatness to allow accurate measurement.

Figure 2:
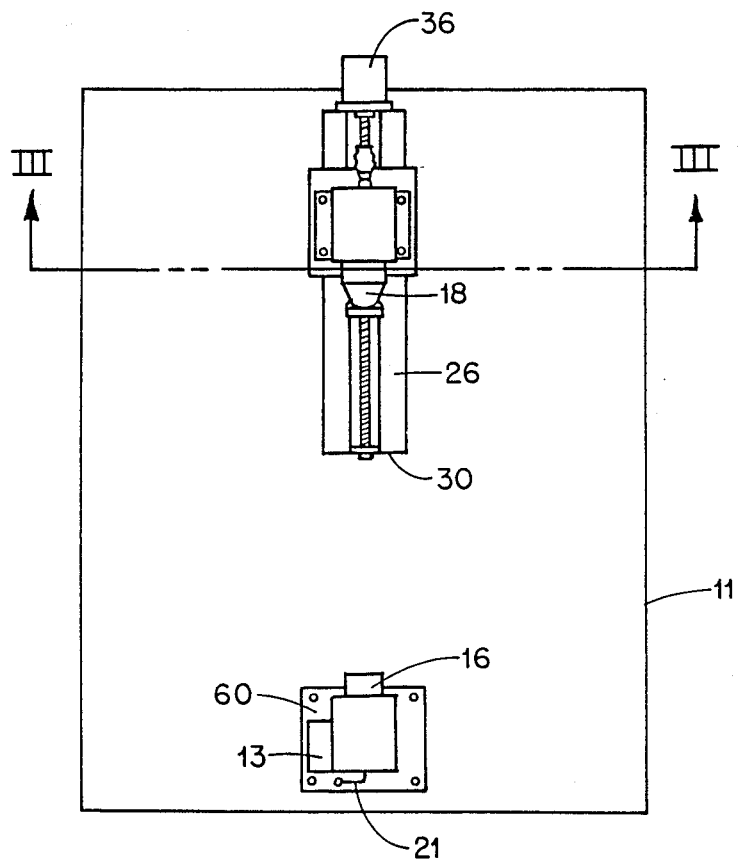
FIG. 2 is an unobstructed top view of the shaft measurement machine of FIG. 1.
Figure 3:
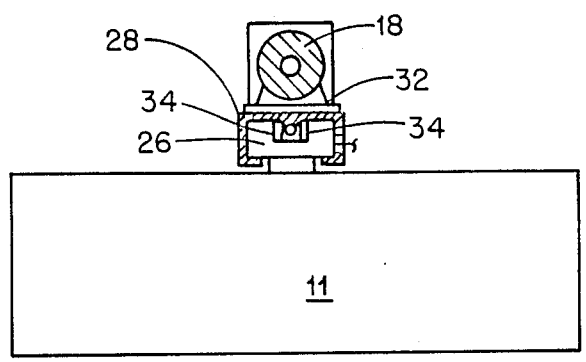
FIG. 3 is a cross section of the shaft measurement machine taken along lines III-III of FIG. 2.

FIG. 2 is a top view of the hollow shaft measurement machine with the exemplary shaft 12 removed and FIG. 3 is a cross section of the view of FIG. 2 taken through the measurement table 11 at the movable/rotatable center 18.

The table 11 of the coordinate measurement machine 14 is modified to accept a rigid mounted precision built hydraulic chuck 16. The chuck 16 is mounted with a mounting block 22 and is associated with a drive motor 13 for rotating the chuck 16 (and the shaft 12) as desired.

Figure 9:
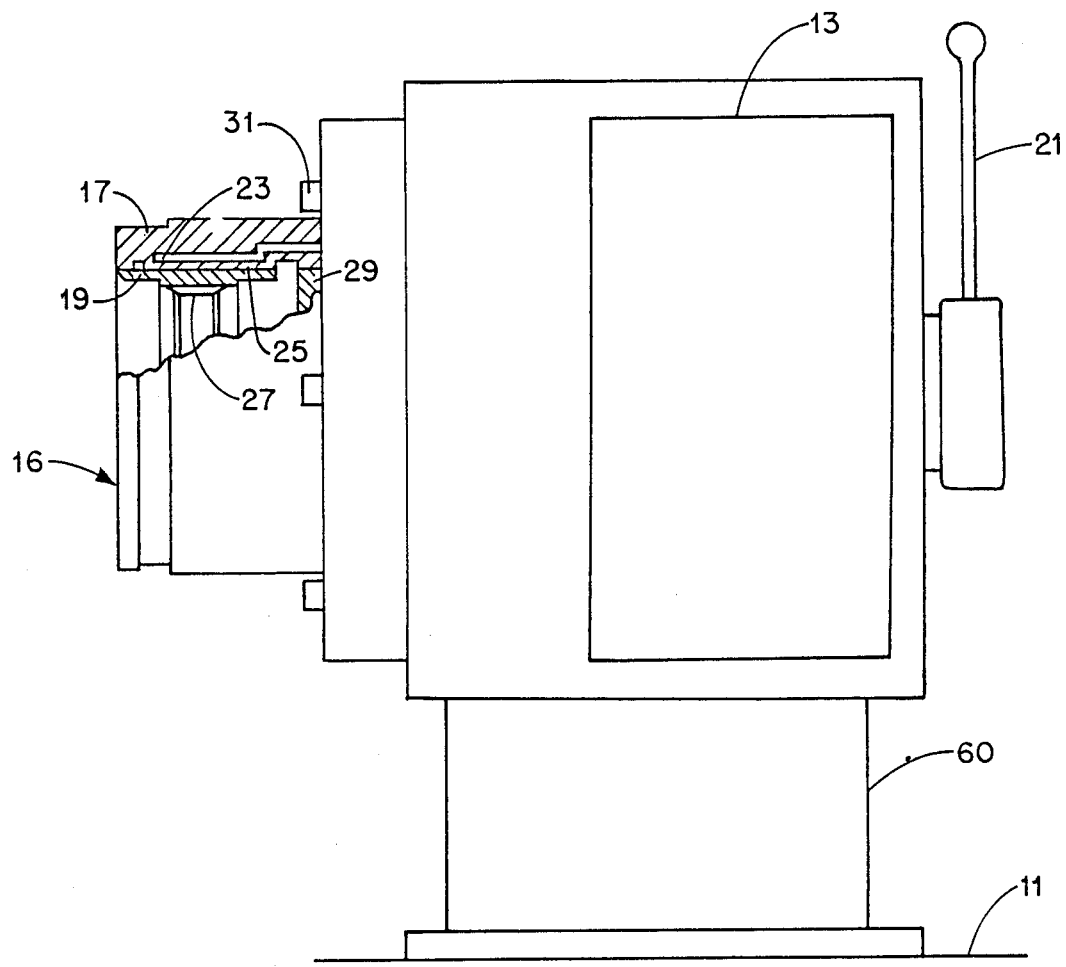
FIG. 9 is a partially broken away side view of an hydraulic chuck embodying principles of this invention.

The hydraulic chuck 16 is shown in greater detail in the close-up view FIG. 9 which is rotated 90 degrees from the view of FIG. 1. The hydraulic chuck is used both to hold and rotate the shaft as well as determine the shaft center line, also known as the shaft's axis of rotation.

The hydraulic chuck comprises a contracting cylinder 17, in which is held a removable spline sleeve 19. An actuation knob 21 is used to force hydraulic fluid in cavity 23 of the hydraulic cylinder to flex a thin wall 25 of the hydraulic contracting cylinder 17. This flexure results in contraction of the spline sleeve 19. Relief slots (not shown) allow for the spline sleeve to contract with flexing of wall 25. This results in a change in the chuck's internal diameter. Splines 27 on the spline sleeve 19 are thereby forced to engage a spline (toothed) portion of hollow shaft 12 (FIG. 1).

Also shown in the broken-away portion of FIG. 9 is an end stop 29 that locates the end of the shaft 12 when it is inserted into the hydraulic chuck 16. Bolts 31 are used to assemble the hydraulic chuck to the mounting block 60.

The center lines of hollow shafts are generally established by measuring the pitch diameter of the external spline teeth on one end of the shaft and the bearing journal on the other end of the shaft. Use of the spline sleeve 19 locates the pitch diameter of the shaft spline. The engagement of the spline sleeve with the shaft spline locates the center line of the shaft at the spline sleeve within 0.0002 inches.

This use of the hydraulic chuck and the spline sleeve at one end of the shaft helps establish the shaft axis of rotation so that all other features of the shaft may be measured to a high degree of accuracy. The other end of the shaft, which includes the bearing journal, is held by the movable/rotatable center 18. The center 18 has a conical section to hold shafts of varying diameter. The coordinate measurement machine 14 is used to identify the shaft centerline at the bearing journal. Use of the journal and spline measurements at opposite ends of the shaft determines the shaft centerline that corresponds to the shaft's axis of rotation during use.

The entire bore gauge assembly 15 can be moved to accommodate different length shafts. The table 11 (FIG. 1) has been modified to accept an air rail 26. This air rail is provided with adjustment control features that allow the axial placing of the bearing carriage 28, which holds the live center 18. The carriage holding the bore gauge assembly 15 interlocks with the air rail as shown in FIG. 3 and is moved by a motor 36 (FIG. 2) that rotates a pinion or other gear means interlocking with a rack or long screw 30. Magnets in the carriage and embedded in the granite table 11 hold the carriage stationary when the air rail is unpowered. The air rail allows the center assembly 15 to be moved axially relative to the hydraulic chuck 16 in order to make the measurement device usable for shafts of varying lengths. A fine adjustment mechanism 29 is also provided for precise axial adjustment of live center position.

The bearing carriage 28 (FIG. 3) is equipped with four non-contact photonic sensors (or alternatively capacitance non-contact probes) 32, to continuously monitor air gap 34 between the carriage 28 and the rail 26. This is done in order to detect when excessive radial loads are exerted upon the center 18 by a bent or misaligned shaft. Radial loads caused by rotation of a bent or misaligned shaft would affect the air gap 34 and would be sensed by the sensors 32. Such excessive bends in the shaft would generally be associated with unacceptable parts.

Figure 4:
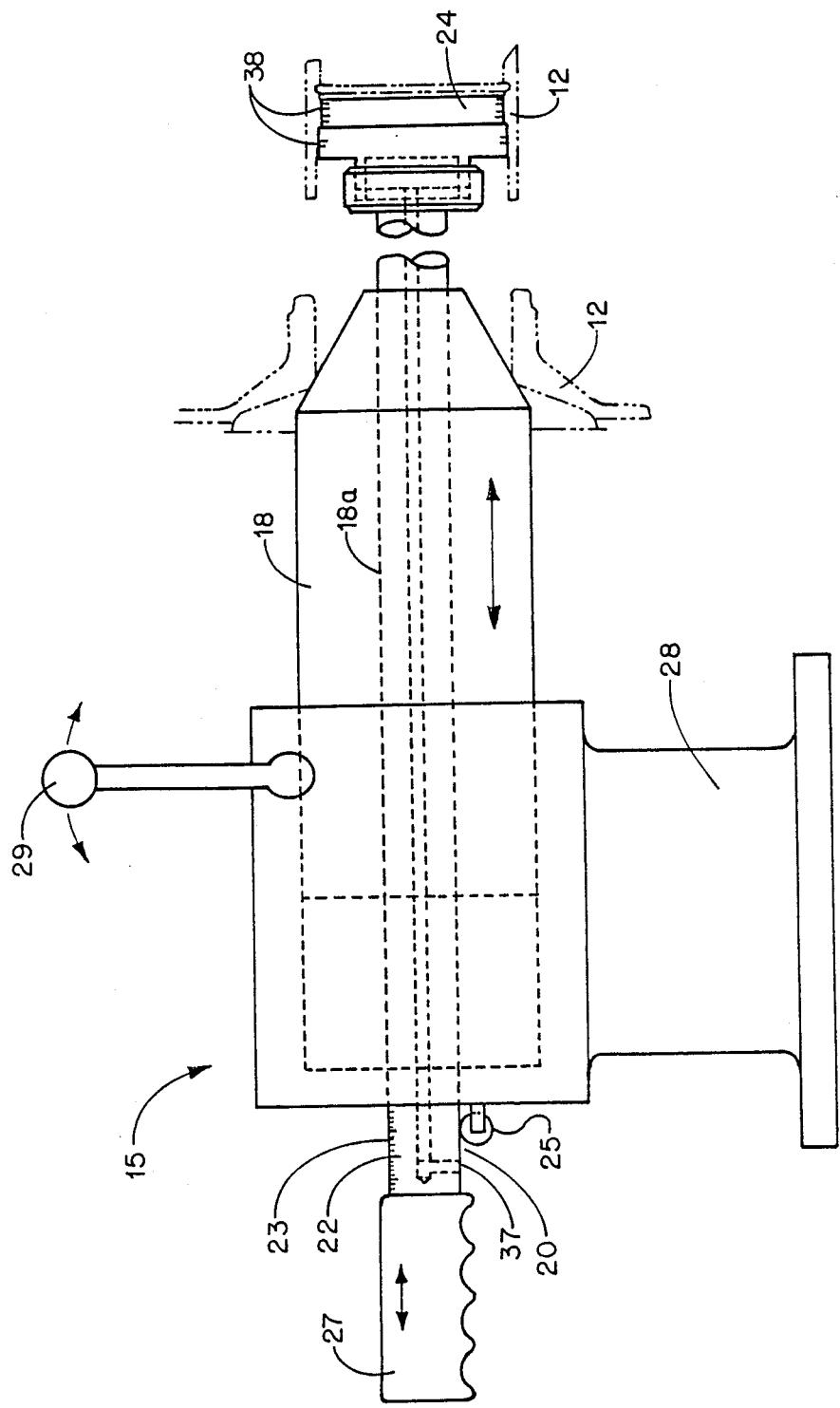
FIG. 4 is an enlarged side view of a rotatable center and an exemplary gauge head of the shaft measurement machine.

The bore gauge 20 apparatus and operation can be more readily understood with reference to FIG. 4, which is an enlarged view of the rotatable (live) center 18 and bore gauge assembly 15. The bore gauge 20 comprises a precision manufactured probe bar 22 and replacable gauge heads 24. The bar 22 extends through the bore gauge assembly 15, which provides a tightly controlled bearing surface 18a for precise positioning of a gauge head 24. The gauge head is positioned inside the shaft when the shaft is mounted on the measurement machine. The probe bar 22 is provided with an accurate linear scale 23 and a thumb wheel actuator 25 mounted on the bearing carriage 28 for precise probe bar movement. Handle 27 is used for manual linear movement of the probe bar relative to the bore gauge assembly 15.

A variety of the gauge heads are used to make possible extremely accurate measurements of the internal surfaces of the shaft 12. Each gauge head has capacitance sensors 38 which are used to sense the exact distance between the known diameter of the gauge head and the unknown internal diameter of the shaft 12. Gauge head 24 (shown) is interchangeable with other gauge (probe) heads of different shapes and configurations for the measurement of a variety of internal shaft configurations.

Prior to the taking of internal measurements, the (external) coordinate measurement machine 14 is used to accurately determine the outside features of the shaft. Any orbiting of the rotated shaft can, therefore, be identified and subtracted from the internally measured coordinates. The drive motor 13 is used to index the shaft so that two sets of measurements, 90 degrees out of phase, are gathered to determine gravitational sagging and flange orthogonality to the shaft axis. After measuring the outside dimensions, the gauge head 24, which has been previously positioned within the shaft, is inserted to a desired depth and locked into a known radial position. From this position, the drive unit motor 13 is used to rotate the shaft 360 degrees so the inside diameters can be determined by the sensors of the gauge head 24.

Figure 5:
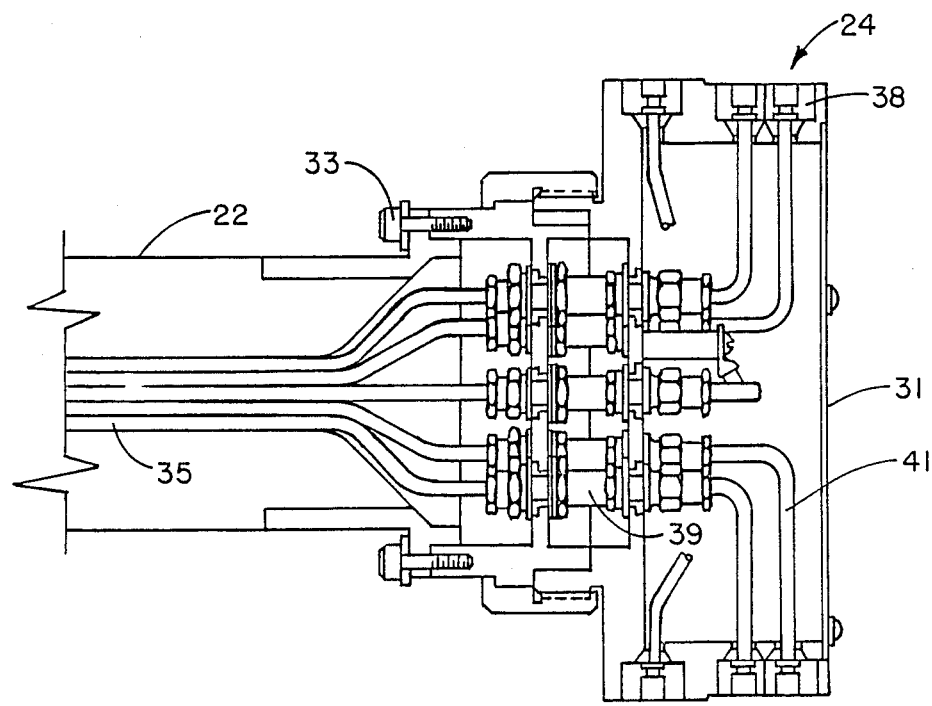
FIG. 5 is a broken-away side view of a radial measuring gauge head for the hollow shaft measurement machine.
Figure 6:
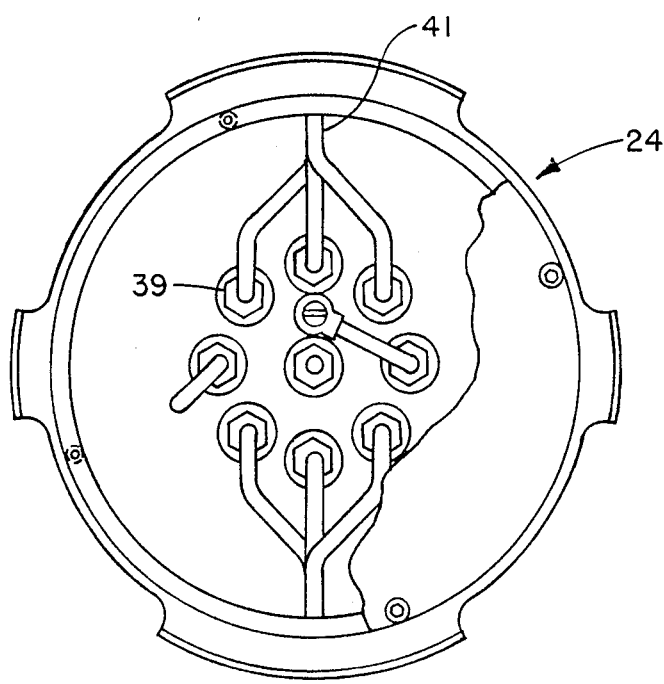
FIG. 6 is an end view, with cover plate partially broken away, of the gauge head of FIG. 5.

FIGS. 5 and 6 show the exemplary gauge head 24 in greater detail. FIG. 5 is a broken away side view of the gauge head 24 and FIG. 6 is an end view of the gauge head with a cover plate 31 partially removed.

Bore gauge head 24 receptacle is bolted to the probe bar 22 by bolts 33. Wires 35 extending through the bar 20 from the wire entrance 37 (FIG. 4) interface with connectors 39 and wires 41 in probe head 24. Although seven wire leads 35 are provided within the head shown, only 6 leads are utilized. The six gauge head wires 41 are connected to capacitance sensors 38, the seventh is used for probe head identification. The sensors are used to measure the internal radial dimensions of the hollow shaft in order to accurately ascertain the internal dimensions of the shaft. The wire leads 41 of the gauge head are also shown in the end view of FIG. 6, where they are shown extending from the connectors 39 to the capacitant probes 38.

Figure 7:
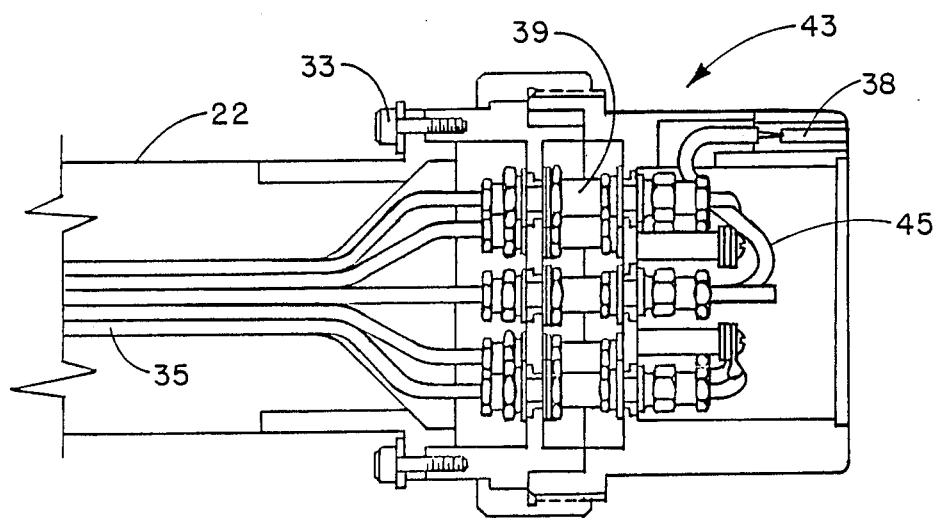
FIG. 7 is a broken-away side view of an axial measuring gauge head for the hollow shaft measurement machine.
Figure 8:
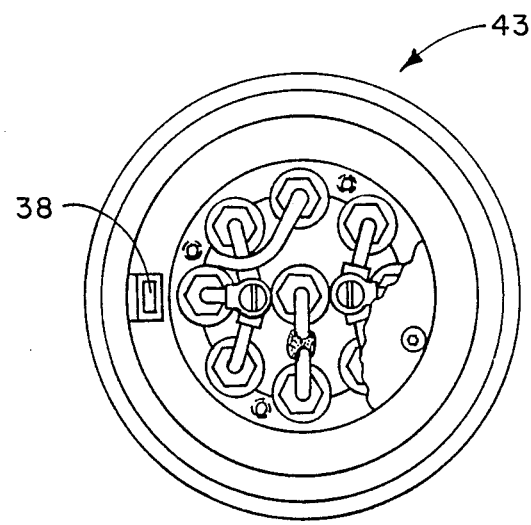
FIG. 8 is an end view, with cover plate partially broken away, of the gauge head of FIG. 7.

FIGS. 7 and 8 disclose an alternate bore gauge head 43 that can also be bolted to probe bar 22 with bolts 33. FIG. 8 is an end view of gauge head 43 of FIG. 7. The seven wire leads 35 are connected to connectors 39 that interfere with the leads 45 of the gauge head 43. In this example of a gauge head, only one of the leads 45 is connected to a capacitant probe 38. This configuration of the gauge head is particularly useful in ascertaining the run out dimensions of axial flanges, such as seal lips, formed inside the hollow shaft 12.

The two gauge heads (24, 43) demonstrate the flexibility of using a number of different gauge heads depending on the internal configuration of the hollow shaft measured. Various size and shape gauge heads can be made to hold capacitant probes 38 or other probe means in the proper position relative to surfaces to be examined on a variety of hollow shafts.

Figure 10:
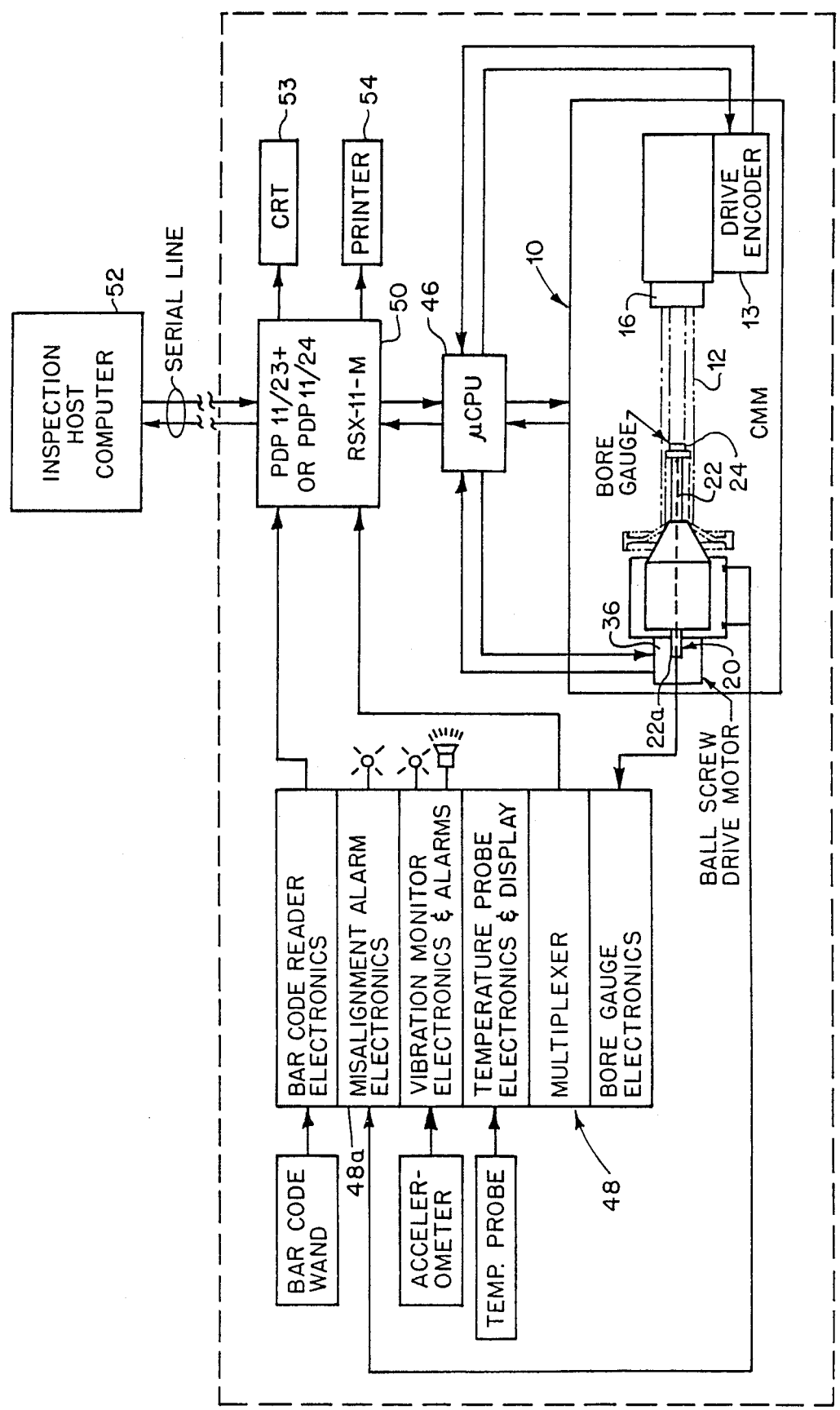
FIG. 10 is a schematic flow diagram showing integration of the shaft measurement machine with computer controls.

The hollow shaft measurement device 10 can be integrated with a computer system for automated operation. A general overview of the shaft measurement device as integrated with a computerized drive and data acquisition system is shown in FIG. 10

In this embodiment, a linear actuator 22a is used to move the probe bar 22 in conjunction with rotation of the shaft 12. The linear actuator can be either a conventional electronic or hydraulic actuator or even a motorized version of the thumb wheel. This allows automated mapping of the interior of the hollow shaft by the bore gauge 20. The shaft measurement machine 10 is connected to a microprocessor 46, which communicates with and controls the drives for the rotating chuck 16 and for inserting the bore gauge. The bore gauge 20 is calibrated and controlled through the use of bore gauge electronics 48 which control the linear actuator. Other electronic elements include a multiplexer, temperature probe electronics and display, vibration monitor alarms, misalignment alarm electronics and a bar code reader for data input. The air rail gap is monitored through the same electronic package and is connected to the misalignment alarm electronics.

The microprocessor 46 communicates with a master computer 50 and a host computer 52, which are used through the application of standard software commands to produce a complete map of the interior dimensions of the shaft 12. These can be shown on a display screen 53 or printed out on a printer 54.

Data is acquired in a discrete form at each axial station around the circumference of the shaft. The number of data points at each axial station is operator programmable and can be varied depending upon the configuration of the shaft and the degree of accuracy required. Acquired analog data is digitized and mathematically operated upon by the microcomputer 46.

In view of the above, it can be seen that this device allows precise measurement of the interior and exterior of hollow shafts and other similar objects as are commonly used in aircraft engines and like devices. This device achieves a much higher degree of accuracy than was heretofore possible when measuring internal dimensions indirectly. This device is capable of measuring internal radii with accuracies in the range $2 \times 10^{-6}$ to $5 \times 10^{-6}$ inches, which is vastly improved over prior art dimensioning techniques.

While the invention has been described with reference to the preferred embodiment thereof, it will be understood by those skilled in the art that changes in substance and form can be made therein without departing from the spirit and scope of the invention as defined in the appended claims.

What is claimed is:

1. A hollow shaft measurement machine, said machine comprising:
   a measurement table, said measurement table having a flat upper measurement surface;
   means for measuring external dimensions of a hollow shaft, said means for measuring movably mounted upon said measurement table;
   a rotatable chuck, said rotatable chuck mounted to said measurement table, said rotatable chuck having means for holding and centering a first end of said hollow shaft;
   a rotatable centering device, said rotatable centering device having means for holding a second end of said hollow shaft, said rotatable centering device having a cylindrical bearing hole therethrough, said rotatable centering device movably mounted to said measurement table;
   a gauge head, said gauge head rotatably mounted in said bearing hole of said centering device, said gauge head having internal measurement means for insertion into the second end of said hollow shaft for measuring internal dimensions of said hollow shaft; and
   signal processing means, said signal processing means connected to said means for measuring external dimensions and to said gauge head for measuring internal dimensions of said hollow shaft, said signal processing means including a computer for controlling actuators that move said means for measuring.

2. A hollow shaft measurement machine as defined by claim 1 further comprising:
   an air rail means mounted to said measurement table; and
   a carriage supporting said rotatable centering device mounted for movement along said air rail means in order to vary the distance between said rotatable chuck and said rotatable centering device, said carriage further having gauge means which monitor a gap between said carriage and said air rail therein in order to detect excessive radial loads on said carriage.

* * * * *